United States Patent

Eftefield et al.

[11] 3,964,803
[45] June 22, 1976

[54] SELF-ALIGNING TRUNNION BEARING ASSEMBLY

[75] Inventors: Larry G. Eftefield; Leon A. Wirt, both of Joliet, Ill.

[73] Assignee: Caterpillar Tractor Co., Peoria, Ill.

[22] Filed: Nov. 22, 1974

[21] Appl. No.: 526,284

[52] U.S. Cl. ............................... 308/72; 172/801; 280/400
[51] Int. Cl.² ................. F16C 11/06; F16C 23/04; F16C 25/04; F16C 33/08
[58] Field of Search ......... 172/801; 280/400, 461 R, 280/481; 308/72

[56] References Cited
UNITED STATES PATENTS

| | | | |
|---|---|---|---|
| 2,312,648 | 3/1943 | Jones | 308/72 X |
| 2,784,508 | 3/1957 | Risk | 172/801 |
| 2,886,299 | 5/1959 | Heimaster et al. | 280/400 X |
| 3,016,273 | 1/1962 | Benoit | 308/72 |
| 3,238,647 | 3/1966 | Hall et al. | 172/801 |
| 3,339,988 | 9/1967 | Schultze | 308/72 X |
| 3,347,577 | 10/1967 | Carlson et al. | 308/72 X |
| 3,411,809 | 11/1968 | Kampert et al. | 280/400 |
| 3,684,314 | 8/1972 | Molby | 308/72 |
| 3,778,174 | 12/1973 | Molby | 280/400 |
| 3,806,158 | 4/1974 | Casey | 280/400 |
| 3,862,769 | 1/1975 | Bechman et al. | 280/400 |

*Primary Examiner*—Albert J. Makay
*Assistant Examiner*—Howard Beltran
*Attorney, Agent, or Firm*—Phillips, Moore, Weissenberger Lempio & Strabala

[57] ABSTRACT

A trunnion ball and socket bearing assembly suitable for coupling the push arms of a bulldozer attachment to the sides of a tractor has a removable sleeve disposed coaxially on a trunnion shaft to define a spherical surface. Separatable bearing caps enclose the sleeve and have inner surfaces of spherical configuration to form a pivot joint which is capable of a limited amount of movement at right angles to the principal pivot axis. The replaceable sleeve fits against an annular shoulder on the trunnion shaft and is held thereon by a circular retainer member secured to the end of the trunnion shaft by bolts having heads which seat in counter bores in the retainer member. The sleeve may be heat treated to provide hardness while the trunnion shaft is separately treated to provide high strength thus providing an element which is more durable than a solid ball while being replaceable when necessary without requiring replacement of the entire trunnion. The sleeve retaining means is compact, inexpensive, may be readily disengaged ad re-engaged and is protected in use from exposure to impacts and abrasion.

6 Claims, 2 Drawing Figures

SELF-ALIGNING TRUNNION BEARING ASSEMBLY

BACKGROUND OF THE INVENTION

This invention relates to trunnion bearing assemblies for coupling elements which must undergo relative movement and more particularly to such bearing assemblies which provide a ball and socket action.

Ball and socket joints are extensively used in a variety of devices to provide for pivoting movement of one element relative to another about a principal pivot axis while providing some limited freedom of movement at right angles to the primary motion. In some usages, trunnion bearing assemblies may be subjected to heavy loads, sudden shock forces, and abrasion. Under these circumstances strength and durability are highly important considerations. Trunnions bearing assemblies are used, for example, to couple the push arms of a bulldozer attachment to the sides of a tractor. In this usage the bearings may be subjected to the severe operating conditions described above and expensive and time consuming repairs or replacement are frequently necessary.

The most common form of ball and socket trunnion joint employs a ball formed as an integral element with the supporting trunnion shaft. It is difficult to design such a ball and socket joint for maximum durability in part because of the practical problems involved in heat treating the bulky metal ball to obtain a desired combination of interior strength for resisting breakage coupled with surface hardness for resisting wear. As different forms of heat treatment are required for these two purposes, the result has been an undesirable compromise wherein the interior of the ball element has less strength than would be desirable while the surface is less hard than would be desirable. Consequently, case crushing, chipping, and rapid wear occur at the surface and breakage is common. When failure or serious deterioration has occurred, the entire ball and trunnion element must be replaced.

It has heretofore been proposed to form the trunnion as a two piece element in which the necessary spherical surface is on a replaceable sleeve which fits coaxially on a cylindrical trunnion shaft. This construction has the potential for alleviating the problems discussed above. The spherically surfaced sleeve may more easily be heat treated to a desired hardness while the shaft on which the sleeve is disposed may be separately heat treated for maximum strength. As heretofore designed, replaceable sleeve trunnion bearings of this kind have been undesirably costly and complex and have been difficult to assemble and reassemble. Heretofore the replaceable sleeve has been secured to the supporting trunnion shaft either by welding or by complex bulky retainer means which adds substantially to the cost and size of the assembly and which require a complicated series of operations in order to replace the spherical surface sleeve.

SUMMARY OF THE INVENTION

This invention is a trunnion bearing assembly, providing a ball and socket action, in which a replaceable sleeve is disposed coaxially on a trunnion shaft and has a spherical outer surface for engaging separatable bearing caps which have a conforming interior spherical surface. The replaceable sleeve is held in place by compact inexpensive retainer means which may be easily engaged and disengaged.

Accordingly, it is an object of this invention to provide a trunnion bearing assembly which is basically more durable but which may be easily, quickly, and inexpensively repaired when that does become necessary.

It is another object of the invention to provide a trunnion bearing assembly having a spherically surfaced replaceable sleeve wherein retainer means for the replaceable sleeve is more easily engaged and disengaged and is less exposed to abrasion and breakage.

The invention, together with further objects and advantages thereof, will best be understood by reference to the following description of a preferred embodiment taken in conjunction with the accompanying drawings.

DESCRIPTION OF THE PREFERRED EMBODIMENT

Figure 1:
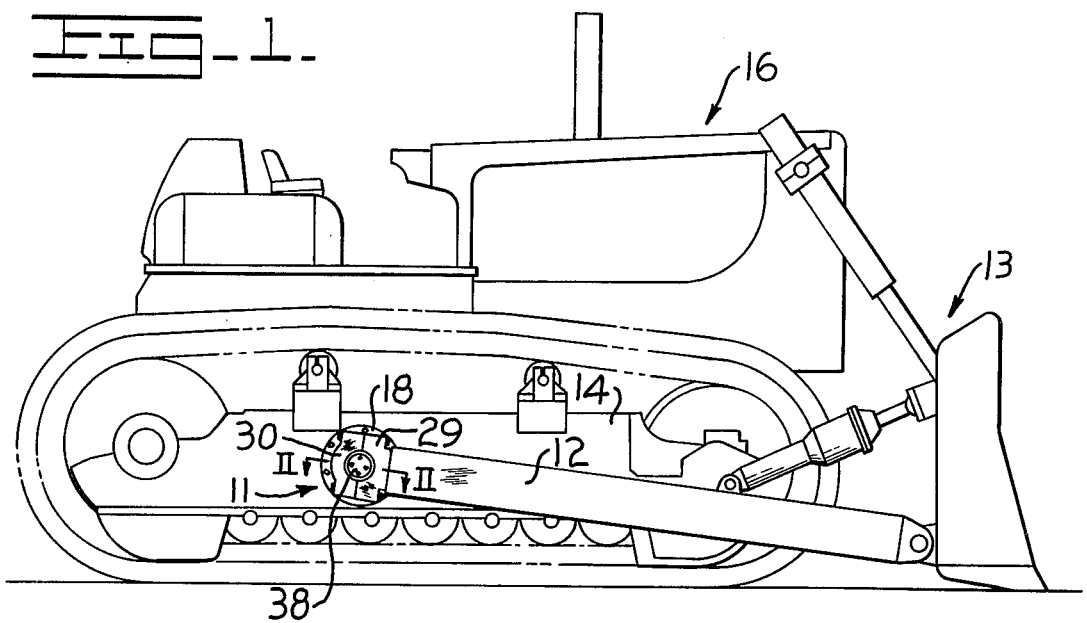
FIG. 1 is an exterior view of a trunnion bearing assembly as utilized to couple a bulldozer attachment to a crawler tractor.
Figure 2:
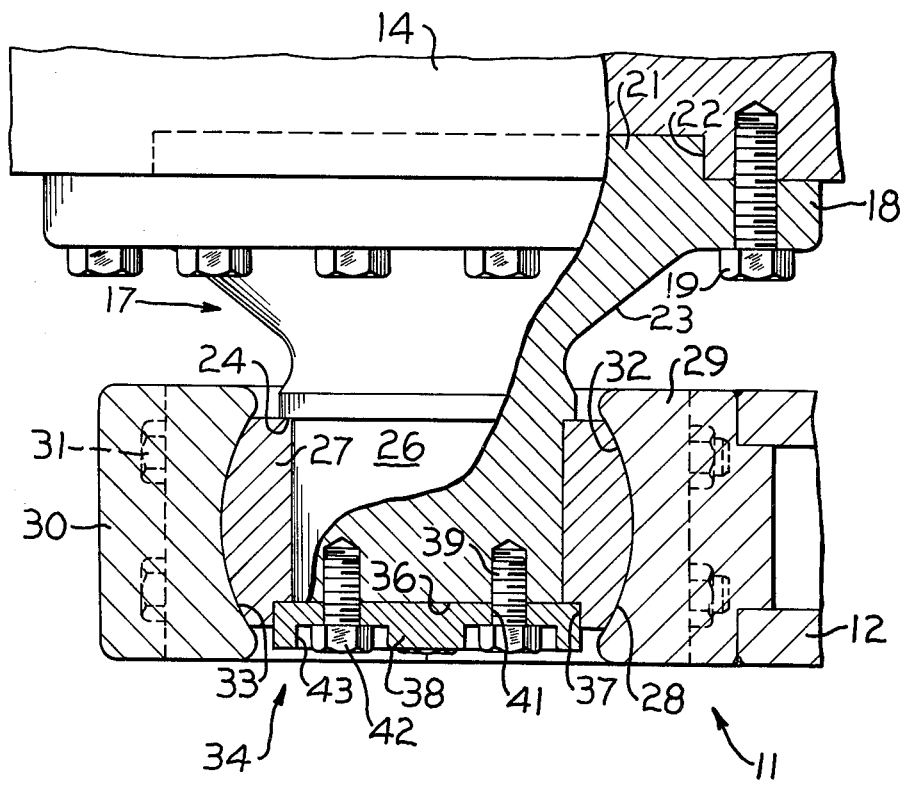
FIG. 2 is a section view taken along line II—II of FIG. 1 illustrating the internal construction of the trunnion bearing assembly thereof.

Referring now to FIGS. 1 and 2 of the drawings in conjunction, a self-aligning trunnion bearing assembly 11 is depicted as employed for coupling the push arms 12 of a bulldozer attachment 13 to the outer sides of the undercarriage frames 14 of a crawler tractor 16. While this is a usage in which the characteristics of the present trunnion bearing 11 are particularly useful, it will be apparent that the invention may also be employed in other situations where an element such as the push arm 12 must be coupled to a supporting structure such as the undercarriage frame 14 while being capable of pivoting motion relative thereto. It will be recognized by those skilled in the art, that a bearing situated in a context such as that illustrated in FIGS. 1 and 2 is subjected to severe and variable loading including sudden impact forces which may be indirect and transmitted through the push arm 12 or which may be direct when the bearing 11 itself comes into contact with an external object such as a large rock.

Referring now to FIG. 2 in particular, trunnion bearing assembly 11 includes a trunnion shaft 17 having a mounting flange 18 at the inner end that may be disposed against undercarriage frame member 14 and secured thereto by bolts 19. To facilitate positioning of the trunnion bearing 11 on the frame 14, a short pilot cylinder portion 21 may be formed integrally on the trunnion shaft to fit into a conforming circular recess 22 in the frame 14. The trunnion shaft 17 may have an intermediate portion 23 which tapers to a lesser diameter outwardly from the frame 14 and flange 18 and which terminates at an annular shoulder 24 that faces towards the outer end portion 26 of the trunnion shaft. Outer end portion 26 has a cylindrical outer surface.

A replaceable sleeve 27 is disposed coaxially on trunnion shaft end portion 26 in abutment with shoulder 24 and has an outer surface 28 of spherical configuration. Sleeve 27 may, if desired, have a slightly smaller internal diameter than the outer diameter of the trunnion shaft portion 26 in order to provide for a shrink fit thereon. In order to replace and remove the sleeve 27 under this condition, the sleeve is heated just prior to emplacement or removal so that it expands sufficiently to provide the necessary clearance.

The sleeve 27 may be formed of different material than the trunnion shaft 26 or may be formed of the same material but subjected to different metallurgical treatment, so that the two elements have different metallurgical characteristics. In most cases, it is desirable that the sleeve 27 be relatively hard in comparison with the trunnion shaft to reduce surface wear, while the trunnion shaft should be of relatively high strength to reduce breakage.

A pair of bearing cap members 29 and 30 are disposed on opposite sides of sleeve 27 and are releasably secured together by means such as bolts 31 which extend through both members. Bearing cap members 29 and 30 have spherical inner surfaces 32 and 33, respectively which fit directly against the spherical surface 28 of sleeve 27, the surfaces 32 and 33 having a curvature conforming to that of sleeve surface 28. Bearing cap members 29 and 30 have a greater thickness along the axis of the trunnion shaft 17 than does the sleeve 27 and thus extend outwardly and inwardly to overlap the sleeve at both ends thereof.

Bulldozer push arm 12 is joined to one of the bearing cap members, member 29 in this instance, by suitable means such as by being welded thereto. Push arm 12 may be pivoted about the axis of trunnion shaft 17 by turning of bearing caps 29 and 30 on sleeve 27 and is also capable of a relatively limited degree of motion in a direction at right angles to the plane of the principal pivoting motion. Thus the trunnion bearing assembly 11 provides an effect similar to that of a ball and socket joint.

Considering now the retainer means 34 which assures retention of the sleeve 27 on the trunnion shaft 17, it should be observed that sleeve 27 has a length somewhat greater than that of the trunnion shaft portion 26 and extends a small distance outwardly from the end surface 36 of the trunnion shaft. An annular recess 37 in the outer end of the sleeve 27 forms a radial extension of the end surface 36 of the trunnion shaft and a circular retainer member 38 seats in the recess against end surface 36. Retainer member 38 is releasably secured to the trunnion shaft by bolts 39 which extend through bores 41 in the retainer member and threadably engage in the end of the trunnion shaft. To protect the heads 42 of bolts 39 from impact forces and abrasion, bores 41 preferably have larger diameter counter bores 43 in which the bolt heads 42 are received. For similar reasons, bearing cap members 29 and 30 are proportioned to extend further outward from trunnion shaft end surface 36 than sleeve 27 and retainer member 38. Thus the relatively massive bearing caps 29 and 30 provide considerable protection for the retaining means against impact forces from external objects.

The trunnion bearing 11 may readily be disassembled for replacement of the sleeve 27 by disengaging bolts 31 and removing bearing cap 30 and by disengaging bolts 39 and removing retainer member 38. Reassembly simply requires a reverse sequence of operations.

While the invention has been described with respect to a specific exemplary embodiment, it will be apparent that many variations are possible and it is not intended to limit the invention except as defined in the following claims.

What is claimed is:

1. A trunnion bearing for securing a pivotable element to a supporting element comprising:
   a trunnion shaft having means for attachment to said supporting element at one end and having an annular shoulder facing the other end,
   a replaceable sleeve disposed coaxially on said trunnion shaft in abutment with said shoulder thereof, said sleeve having an outer surface of spherical configuration,
   a pair of bearing cap members secured together by releasable means and having inner surfaces which jointly form a spherical surface conforming to said outer surface of said sleeve and which is in contact therewith, one of said bearing cap members having means for attachment to said pivotable element,
   a circular retainer member abutted against said other end of said trunnion shaft in coaxial relationship therewith and being of greater diameter than said other end of said trunnion shaft to form a radially outwardly extending surface adjacent said other end of said trunnion shaft in order to hold said replaceable sleeve thereon, and
   disengageable threaded fastener means extending from said other end of said trunnion shaft into said retainer member to hold said retainer member in abutment against said other end of said trunnion shaft.

2. A trunnion bearing as defined in claim 1 wherein said bearing cap members are of greater thickness than said replaceable sleeve as measured along the axis of said trunnion shaft to overlap and protect said retainer and fastener means.

3. A trunnion bearing as defined in Claim 1 wherein said bearing cap members extend outwardly a distance from said other end of said trunnion shaft and wherein said replacable sleeve extends outwardly a lesser distance therefrom, said replacable sleeve having an annular recess in the outwardly extending end for receiving said circular retainer.

4. A trunnion bearing as defined in Claim 1 wherein said fastener means comprises at least one bolt extending through said circular retainer and being threadably engaged in said outer end of said trunnion shaft.

5. A trunnion bearing as defined in Claim 4 wherein said bolt has a threaded portion engaged in said outer end of said trunnion shaft and has an enlarged head portion adapted to be gripped and turned by a tool, and wherein said circular retainer is transpierced by a bore for receiving said bolt, said bore having an enlarged diameter counterbore at the side of said retainer which is more distant from said trunnion shaft for receiving and protecting said head of said bolt.

6. A trunnion bearing for securing a pivotable element to a supporting element comprising:
   a trunnion shaft having means for attachment to said supporting element at one end and having an annular shoulder facing the other end,
   a replaceable sleeve disposed coaxially on said trunnion shaft in abutment with said shoulder thereof, said sleeve having an outer surface of spherical configuration, wherein said replaceable sleeve extends a distance outwardly from said other end of said trunnion shaft and has an annular recess forming an extension of the end surface of said trunnion shaft,
   a pair of bearing cap members secured together by releasable means and having inner surfaces which jointly form a spherical surface conforming to said outer surface of said sleeve and which is in contact therewith, one of said bearing cap members having means for attachment to said pivotable element, a circular retainer disposed against said other end of said trunnion shaft in coaxial relationship therewith and being of greater diameter than said other end of said trunnion shaft in order to hold said replaceable sleeve thereon, wherein said circular retainer is a flat disc disposed against said end surface of said shaft and against said extension of said end surface formed by said sleeve recess and being transpierced by a plurality of spaced-apart stepped bores, and disengageable fastener means extending from said other end of said trunnion shaft into said retainer to hold said retainer thereon, wherein said disengageable fastener means are a plurality of threaded bolts each extending into one of said bores and being engaged in said other end of said trunnion shaft, said bolts being substantially wholly contained within said other end of said trunnion shaft and said bores of said retainer.

* * * * *